Patented May 17, 1932

1,858,374

UNITED STATES PATENT OFFICE

WILLIAM A. ROOKER AND VICTOR E. SPEAS, OF KANSAS CITY, MISSOURI, ASSIGNORS TO SPEAS MFG. CO., OF KANSAS CITY, MISSOURI, A CORPORATION OF MISSOURI

PROCESS FOR MAKING JAMS, JELLIES AND KINDRED PRODUCTS

No Drawing.   Application filed August 3, 1929.   Serial No. 383,421.

This invention relates to a process of manufacturing jams, jellies, marmalades, preserves or confections that contain as essential ingredients, pectous substances and an acid.

Our invention relates more particularly to a process conducted in such a manner as to retain the full setting power of the pectous substances present in the fruit or added in the form of commercial pectin preparations and also to eliminate undesirable color changes. We have discovered that there is a critical temperature at and above which acidulated pectous solutions darken in color and lose materially in jelly strength.

As a result of practicing our invention, the manufacturer obtains either of two advantages or a combination of both. First, he can secure a substantial saving by reducing the amount of pectin required or; second, he can obtain a much stiffer consistency or firmer set without the use of an additional quantity of pectin.

In preparing jams, jellies, preserves, etc., the manufacturer attempts to secure certain physical characteristics in the finished products, i. e., the firm consistency of jams or the jellied condition of jellies. To obtain these desired characteristics, it is necessary to make a proper combination of three essential constituents, acid, sugar and pectin. Because of natural deficiencies, or to obtain economies, or to more accurately control the finished product, the manufacturer usually adds the proper amounts of sugar, acid and pectin to his fruit or fruit juice.

By the usual processes of manufacture, the various ingredients are mixed in a suitable cooker or kettle and the mass is then concentrated to the desired end point. The soluble solids in the mass are mostly sugar and the manufacturing process is, therefore, easily controlled by using the thermometers, as sugar solutions of various concentrations have definite and constant boiling points. For example, in cooking jellies, the common practice is to cook the mass until the thermometer shows a reading of 217° to 220° F. Jams are finished at slightly higher temperatures.

We have found that when a pectous solution containing only 0.1% of an organic acid, is heated to 170° F., the jell strength or setting power is materially weakened and the color of the solution is considerably darkened. Increasing either the temperature or the acid greatly intensifies this deteriorating action. It is, therefore, self-evident that much of the jelling strength of the pectous substances is lost when the mass, as in common, everyday practice, is cooked to 217° to 224° F. and contains 0.4% to 1.0% of organic acid. For example, we have found that in using a powdered pectin standardized as No. 80 strength (one pound setting eighty pounds of sugar), by the usual practice of cooking to 218° Fahr. and adding the acid to the hot mass, by this new process, the jell strength is increased to 160 to 180 test. Although the jellies prepared in the usual manner were very dark, those prepared by our new process were almost colorless, thus exemplifying the advantages previously mentioned that result from practicing our invention, i. e., a substantial saving in the amount of pectin required to produce the desired set or consistency and an improvement in the color and quality of the finished product.

Our invention consists in preparing jams, jellies, etc. in such a manner that the pectous substances are not subjected to extremes of acid and heat at the same time. In following our invention, it is very important to keep the acid at the minimum during the cooking of the mass and equally important to cool the mass to 170° Fahr. or lower, before adding the acid. Although it is preferable to cool the mass to the temperature specified (170° F.) we do not wish to limit the spirit of our invention to any exact temperature, as we have found that any appreciable reduction in the usual temperatures before adding the acid is of material advantage.

The following is an example of the application of our invention to the preparation of a plain pectin jelly, using water, sugar, No. 80 pectin and a fruit acid:

Eight ounces (50% of the usual amount required) of No. 80 pectin is mixed with two pounds of sugar and placed in a suitable kettle.

Six and one half to seven and one half gallons of water is then added to the pectin-sugar mixture and after stirring for two to three minutes, heat is applied and the mass is brought to a boil. Seventy eight pounds of sugar (making a total of eightly pounds) is then added and the cooking is continued until the concentration of the sugar has reached the desired point, as indicated by a thermometer.

When the correct sugar concentration is obtained, the mass is then cooled to 170° Fahr., or lower and the correct amount of acid is then added. For a batch of this size, eight to ten ounces of dry tartaric or citric acid is required. The acid is usually dissolved in one to two pints of water before adding it to the batch. The cooling of the mass previous to adding the acid, may be accomplished by any desired means.

For example, the hot syrup may be passed through cooling coils or the steam jacketed kettle may be equipped with cold water connections so that cold water, instead of steam, can be circulated through the jacket. Due to the material differences between the temperatures of the hot mass and the temperatures of the circulating cold water, very little time is required to reduce the temperature of the mass to 170° Fahr., or lower.

While the example herein given illustrates the application of the invention to the preparation of a plain pectin jelly, it will be apparent that the invention when applied to the preparation of conserves, preserves, jams, and jellies, the water may be supplied by, or partly or wholly replaced by, fruit, and/or fruit juice.

Jellies, jams, preserves, etc. prepared by our method as described in the example given, will have very firm sets or consistencies and bright, unaltered colors. Material economy is also effected because of the fact that our method requires only 50% of the amount of pectin necessary in using present methods.

While we have herein given an illustration of the invention, it is to be understood that our invention is not limited thereto but may comprehend other steps, proportions and features without departing from the spirit thereof.

Having disclosed the invention, we claim:

1. A process of making a jelly-like product, comprising boiling a mixture of sugar, water and pectin to a desired concentration of the sugar, lowering the temperature of the boiled mass to about 170° F. or less, adding an organic acid thereto in an amount sufficient to effect, jellifying, and permitting such mass to cool whereby setting takes place.

2. A process of making a jelly-like product, comprising boiling to a desired concentration, a mixture of sugar, and pectous substance, and crushed fruit or fruit juice containing sufficient water for the mixture, lowering the temperature of the boiled mass to about or below 170° F., and adding an edible acid in sufficient quantity for causing a jellifying of the mass.

3. A process of making a jelly-like product, comprising mixing pectin, sugar and water, bringing said mixture to a boil, adding sugar to a desired amount, boiling this mixture until the desired concentration of the sugar is reached, cooling the boiled mass to a temperature of about or below 170° F., and adding a quantity of an edible acid sufficient to cause the mass to jell.

4. A process of making a jelly-like product, comprising mixing a pectous substance with sugar, a fruit, crushed fruit or fruit juice, containing sufficient water for the mixture, boiling the mixture until the desired concentration of sugar is reached, lowering the temperature of the boiled mass to about or below 170° F., and adding edible acid in sufficient quantity to effect a jelling of the mass.

In witness whereof, we hereunto subscribe our names to this specification.

WILLIAM A. ROOKER.
VICTOR E. SPEAS.